US009656322B2

(12) United States Patent
Okamoto et al.

(10) Patent No.: US 9,656,322 B2
(45) Date of Patent: May 23, 2017

(54) METHOD FOR PRODUCING SILVER NANOPARTICLES, SILVER NANOPARTICLES, AND SILVER COATING MATERIAL COMPOSITION

(71) Applicant: DAICEL CORPORATION, Osaka-shi, Osaka (JP)

(72) Inventors: Kazuki Okamoto, Himeji (JP); Hiroyoshi Koduma, Himeji (JP)

(73) Assignee: DAICEL CORPORATION, Osaka-shi (JP)

( * ) Notice: Subject to any disclaimer, the term of this patent is extended or adjusted under 35 U.S.C. 154(b) by 185 days.

(21) Appl. No.: 14/419,606

(22) PCT Filed: Jul. 29, 2013

(86) PCT No.: PCT/JP2013/070516
§ 371 (c)(1),
(2) Date: Feb. 4, 2015

(87) PCT Pub. No.: WO2014/024721
PCT Pub. Date: Feb. 13, 2014

(65) Prior Publication Data
US 2015/0224578 A1  Aug. 13, 2015

(30) Foreign Application Priority Data
Aug. 7, 2012 (JP) .............................. 2012-175473

(51) Int. Cl.
| | | |
|---|---|---|
| *C09D 11/52* | (2014.01) | |
| *C09D 5/24* | (2006.01) | |
| *C22B 11/02* | (2006.01) | |
| *B22F 1/00* | (2006.01) | |
| *H01B 1/02* | (2006.01) | |
| *H01B 1/22* | (2006.01) | |
| *B22F 9/30* | (2006.01) | |
| *B82Y 30/00* | (2011.01) | |
| *B82Y 40/00* | (2011.01) | |
| *C09D 1/00* | (2006.01) | |
| *C09D 7/12* | (2006.01) | |
| *C22C 5/06* | (2006.01) | |
| *H01B 5/14* | (2006.01) | |
| *H01B 13/00* | (2006.01) | |
| *C08K 3/08* | (2006.01) | |

(52) U.S. Cl.
CPC .............. *B22F 9/30* (2013.01); *B22F 1/0018* (2013.01); *B82Y 30/00* (2013.01); *B82Y 40/00* (2013.01); *C09D 1/00* (2013.01); *C09D 5/24* (2013.01); *C09D 7/12* (2013.01); *C09D 7/1266* (2013.01); *C22B 11/02* (2013.01); *C22C 5/06* (2013.01); *H01B 1/02* (2013.01); *H01B 1/22* (2013.01); *H01B 5/14* (2013.01); *H01B 13/00* (2013.01); *C08K 2003/0806* (2013.01)

(58) Field of Classification Search
CPC .. C09D 11/52; C09D 5/24; C08K 2003/0806; C22B 11/02; B22F 1/0018; B82Y 30/00; B82Y 40/00; H01B 1/02; H01B 1/22
USPC .......................... 106/31.92; 252/514; 75/370
See application file for complete search history.

(56) References Cited

U.S. PATENT DOCUMENTS

| | | | |
|---|---|---|---|
| 7,270,694 B2 * | 9/2007 | Li ......................... | B22F 1/0018 75/351 |
| 7,491,646 B2 * | 2/2009 | Wu ........................ | C23C 18/08 257/E21.159 |
| 8,088,437 B2 | 1/2012 | Lee et al. | |
| 9,422,443 B2 * | 8/2016 | Iguchi .................... | C09D 11/52 |
| 2008/0124238 A1 | 5/2008 | Atsuki et al. | |
| 2009/0031856 A1 * | 2/2009 | Lee ........................ | B22F 9/24 75/343 |
| 2009/0214764 A1 * | 8/2009 | Li ......................... | B22F 1/0018 75/370 |
| 2010/0120960 A1 | 5/2010 | Lee et al. | |
| 2010/0189901 A1 | 7/2010 | Chung et al. | |
| 2011/0193034 A1 | 8/2011 | Nakamoto et al. | |
| 2012/0043510 A1 | 2/2012 | Kurihara et al. | |
| 2013/0334470 A1 | 12/2013 | Kurihara et al. | |
| 2014/0346412 A1 | 11/2014 | Okamoto et al. | |
| 2015/0001452 A1 | 1/2015 | Kurihara et al. | |
| 2015/0217375 A1 * | 8/2015 | Iguchi .................. | B22F 1/0018 75/370 |

FOREIGN PATENT DOCUMENTS

| | | |
|---|---|---|
| CN | 101678460 A | 3/2010 |
| JP | 2006-169613 A | 6/2006 |

(Continued)

OTHER PUBLICATIONS

International Preliminary Report on Patentability and Written Opinion of the International Searching Authority with English translation thereof (Forms PCT/IB/338, PCT/IB/373, PCT/ISA/237 and PCT/IB/326), dated Feb. 19, 2015, for International Application No. PCT/JP2013/070516.

(Continued)

*Primary Examiner* — Helene Klemanski
(74) *Attorney, Agent, or Firm* — Birch, Stewart, Kolasch & Birch, LLP

(57) ABSTRACT

The present invention provides silver nano-particles that are excellent in stability and develop excellent conductivity by low-temperature calcining, a method for producing the silver nano-particles, and a silver coating composition comprising the silver nano-particles. A method for producing silver nano-particles comprising: mixing a silver compound with an aliphatic amine comprising at least a branched aliphatic hydrocarbon monoamine (D) comprising a branched aliphatic hydrocarbon group and one amino group, said branched aliphatic hydrocarbon group having 4 or more carbon atoms, to form a complex compound comprising the silver compound and the amine; and thermally decomposing the complex compound by heating to form silver nanoparticles.

12 Claims, No Drawings

(56) References Cited

FOREIGN PATENT DOCUMENTS

| JP | 2010-265543 A | 6/2006 |
| JP | 2008-214695 A | 9/2008 |
| JP | 2012-162767 A | 8/2012 |
| JP | 2012-246560 A | 12/2012 |
| JP | 2013-142172 A | 7/2013 |
| JP | 2013-142173 A | 7/2013 |
| WO | WO 2012/105682 A1 | 8/2012 |
| WO | WO 2013/105530 A1 | 7/2013 |
| WO | WO 2013/105531 A1 | 7/2013 |
| WO | WO 2013/111856 A1 * | 8/2013 |

OTHER PUBLICATIONS

International Search Report, issued in PCT/JP2013/070516, dated Aug. 27, 2013.
Written Opinion of the International Searching Authority, issued in PCT/JP2013/070516, dated Aug. 27, 2013.
Extended European Search Report issued Mar. 1, 2016, in European Patent Application No. 13827300.8.
Park et al., "Preparation and Stabilization of Ag Nanoparticles in 1-Amino-4-methylpiperazine," Bull. Korean Chem. Soc. (2011), vol. 32, No. 1, pp. 273-276.
Office Action issued Oct. 27, 2015, in Chinese Patent Application No. 201380041410.4.

* cited by examiner

METHOD FOR PRODUCING SILVER NANOPARTICLES, SILVER NANOPARTICLES, AND SILVER COATING MATERIAL COMPOSITION

TECHNICAL FIELD

The present invention relates to a method for producing silver nano-particles and silver nano-particles. The present invention also relates to a silver coating composition containing the silver nano-particles. The present invention is applied also to a method for producing metal nano-particles containing a metal other than silver and metal nano-particles.

BACKGROUND ART

Silver nano-particles can be sintered even at a low temperature. Utilizing this property, a silver coating composition containing silver nano-particles is used to form electrodes or conductive circuit patterns on a substrate in production of various electronic devices. Silver nano-particles are usually dispersed in an organic solvent. Silver nano-particles have an average primary particle diameter of about several nanometers to about several tens of nanometers, and their surfaces are usually coated with an organic stabilizer (protective agent). When the substrate is a plastic film or sheet, silver nano-particles need to be sintered at a low temperature (e.g., at 200° C. or less) less than a heat resistant temperature of the plastic substrate.

Particularly, attempts have been recently made to form fine metal lines (e.g., silver lines) not only on heat-resistant polyimide substrates that are already in use as substrates for flexible printed circuit boards but also on substrates made of various plastics, such as PET (polyethylene terephthalate) and polypropylene, that have lower heat resistance than polyimide but can be easily processed and are cheap. When plastic substrates having low heat resistance are used, metal nano-particles (e.g., silver nano-particles) need to be sintered at a lower temperature.

For example, JP-A-2008-214695 discloses a method for producing silver ultrafine particles, comprising reacting silver oxalate and oleylamine to form a complex compound containing at least silver, oleylamine and an oxalate ion; and thermally decomposing the formed complex compound to form silver ultrafine particles (claim 1). Further, JP-A-2008-214695 discloses that in the above method, a saturated aliphatic amine having 1 to 18 carbon atoms in total is reacted in addition to the silver oxalate and the oleylamine (claims 2 and 3), so that a complex compound can be easily formed, the time required to produce silver ultrafine particles can be reduced, and the silver ultrafine particles protected by these amines can be formed in higher yield (paragraph [0011]).

JP-A-2010-265543 discloses a method for producing coated silver ultrafine particles, comprising the first step of mixing a silver compound that is decomposed by heating to generate metallic silver, a mid- to short-chain alkylamine having a boiling point of 100° C. to 250° C., and a mid- to short-chain alkyldiamine having a boiling point of 100° C. to 250° C. to prepare a complex compound containing the silver compound, the alkylamine and the alkyldiamine; and the second step of thermally decomposing the complex compound (claim 3, paragraphs [0061] and [0062]).

PRIOR ART DOCUMENTS

Patent Documents

Patent Document 1: JP-A-2008-214695
Patent Document 2: JP-A-2010-265543

SUMMARY OF THE INVENTION

Problems to be Solved by the Invention

Silver nano-particles have an average primary particle diameter of about several nanometers to about several tens of nanometers, and are more likely to agglomerate than micron (μm)-size particles. Therefore, the reduction reaction of a silver compound (thermal decomposition reaction in the above patent documents) is performed in the presence of an organic stabilizer (protective agent such as an aliphatic amine or an aliphatic carboxylic acid) so that the surfaces of resulting silver nano-particles are coated with the organic stabilizer.

Meanwhile, silver nano-particles are used in a silver coating composition (silver ink or silver paste) in which the particles are contained in an organic solvent. In order to development conductivity, an organic stabilizer coating the silver nano-particles needs to be removed during calcining performed after application of the silver coating composition onto a substrate to sinter the silver particles. When the temperature of the calcining is low, the organic stabilizer is poorly removed. When the silver particles are not sufficiently sintered, a low resistance value cannot be achieved. That is, the organic stabilizer present on the surfaces of the silver nano-particles contributes to the stabilization of the silver nano-particles, but on the other hand, interferes with the sintering of the silver nano-particles (especially, sintering by low-temperature calcining).

The use of an aliphatic amine compound and/or an aliphatic carboxylic acid compound each having a relatively long chain (e.g., 8 or more carbon atoms) as an organic stabilizer makes it easy to stabilize silver nano-particles because it is easy to ensure space between the silver nano-particles. On the other hand, the long-chain aliphatic amine compound and/or the long-chain aliphatic carboxylic acid compound are/is poorly removed when the temperature of calcining is low.

As described above, the relationship between the stabilization of silver nano-particles and the development of a low resistance value by low-temperature calcining is a tradeoff.

As described above, in JP-A-2008-214695, oleylamine having 18 carbon atoms and a saturated aliphatic amine having 1 to 18 carbon atoms are used in combination as aliphatic amine compounds. However the use of oleylamine as a main ingredient of a protective agent inhibits sintering of silver nano-particles during low-temperature calcining. Further, the reaction rate of forming a complex compound of oleylamine and silver oxalate is not satisfactory.

As described above, in JP-A-2010-265543, a mid- to short-chain alkylamine having a boiling point of 100° C. to 250° C. (paragraph [0061]) and a mid- to short-chain alkyldiamine having a boiling point of 100° C. to 250° C. (paragraph [0062]) are used in combination as aliphatic amine compounds. This method improves the problem resulting from the use of oleylamine as a main ingredient of a protective agent. However, it is desired that the production process of silver nano-particles or the performance of resulting silver nano-particles (development of a low resistance value by low-temperature calcining) is further improved.

It is therefore an object of the present invention to provide silver nano-particles that are excellent in stability and develop excellent conductivity (low resistance value) by low-temperature calcining, especially silver nano-particles that develop conductivity (low resistance value) even when a calcined silver film having a thickness of, for example, 1 µm or more is formed by low-temperature calcining, and a method for producing the silver nano-particles. It is also an object of the present invention to provide a silver coating composition comprising the silver nano-particles.

Means for Solving the Problems

The present inventors have studied aliphatic amine compounds that function as a complex-forming agent and/or a protective agent, and have found a method capable of obtaining silver nano-particles that are excellent in stability and develop excellent conductivity (low resistance value) even when a silver coating film having a relatively large thickness of, for example, 1 µm or more is formed by calcining at a low temperature of 200° C. or less (e.g., 150° C. or less, preferably 120° C. or less) and for a short time of 2 hours or less (e.g., 1 hour or less, preferably 30 minutes or less).

The present invention includes the following aspects.

(1) A method for producing silver nano-particles comprising:

mixing a silver compound with an aliphatic amine comprising at least a branched aliphatic hydrocarbon monoamine (D) comprising a branched aliphatic hydrocarbon group and one amino group, said branched aliphatic hydrocarbon group having 4 or more carbon atoms, to form a complex compound comprising the silver compound and the amine; and thermally decomposing the complex compound by heating to form silver nano-particles.

(2) The method for producing silver nano-particles according to the above (1), wherein the silver compound is silver oxalate.

(3) The method for producing silver nano-particles according to the above (1) or (2), wherein the branched aliphatic hydrocarbon group in the branched aliphatic hydrocarbon amine (D) has 4 to 16 carbon atoms.

(4) The method for producing silver nano-particles according to any one of the above (1) to (3), wherein the aliphatic amine further comprises at least one of:

a linear aliphatic hydrocarbon monoamine (B) comprising a linear aliphatic hydrocarbon group and one amino group, said aliphatic hydrocarbon group having 5 or less carbon atoms in total; and an aliphatic hydrocarbon diamine (C) comprising an aliphatic hydrocarbon group and two amino groups, said aliphatic hydrocarbon group having 8 or less carbon atoms in total.

(5) The method for producing silver nano-particles according to the above (4), wherein the aliphatic hydrocarbon monoamine (B) is an alkylmonoamine having 2 or more and 5 or less carbon atoms.

(6) The method for producing silver nano-particles according to the above (4) or (5), wherein the aliphatic hydrocarbon monoamine (B) is a butylamine.

(7) The method for producing silver nano-particles according to any one of the above (1) to (6), wherein the aliphatic amine further comprises a linear aliphatic hydrocarbon monoamine (A) comprising a linear aliphatic hydrocarbon group and one amino group, said aliphatic hydrocarbon group having 6 or more carbon atoms in total.

(8) The method for producing silver nano-particles according to the above (7), wherein the aliphatic hydrocarbon monoamine (A) is an alkylmonoamine having 6 or more and 12 or less carbon atoms.

(9) The method for producing silver nano-particles according to any one of the above (1) to (8), wherein the branched aliphatic hydrocarbon amine (D) is contained in an amount of 10 mol % to 50 mol % of a total of the aliphatic amine.

(10) The method for producing silver nano-particles according to any one of the above (1) to (9), wherein the aliphatic amine is used in a total amount of 1 to 50 moles per 1 mole of silver atoms in the silver compound.

A molecule of silver oxalate contains two silver atoms. The method for producing silver nano-particles according to any one of the above (1) to (9), wherein when the silver compound is silver oxalate, the aliphatic amine is used in a total amount of 2 to 100 moles per 1 mole of silver oxalate.

(11) Silver nano-particles produced by the method according to any one of the above (1) to (10).

Coated silver nano-particles whose surfaces are coated with a protective agent, wherein the protective agent comprises at least the branched aliphatic hydrocarbon amine (D).

Coated silver nano-particles whose surfaces are coated with a protective agent, wherein the protective agent comprises:

the branched aliphatic hydrocarbon amine (D); and at least one of the linear aliphatic hydrocarbon monoamine (B) having 5 or less carbon atoms in total and the aliphatic hydrocarbon diamine (C).

Coated silver nano-particles whose surfaces are coated with a protective agent, wherein the protective agent comprises:

the branched aliphatic hydrocarbon amine (D);

at least one of the linear aliphatic hydrocarbon monoamine (B) having 5 or less carbon atoms in total and the aliphatic hydrocarbon diamine (C); and the linear aliphatic hydrocarbon monoamine (A) having 6 or more carbon atoms in total.

(12) A silver coating composition comprising silver nano-particles produced by the method according to any one of the above (1) to (10), and an organic solvent. The silver coating composition may take any form without any limitation. For example, a silver coating composition in which the silver nano-particles are dispersed in suspension state in the organic solvent, or a silver coating composition in which the silver nano-particles are dispersed in kneaded state in the organic solvent.

(13) A silver conductive material comprising:

a substrate, and a silver conductive layer obtained by applying, onto the substrate, a silver coating composition comprising silver nano-particles produced by the method according to any one of the above (1) to (10) and an organic solvent, and calcining the silver coating composition. The calcining is performed at a temperature of 200° C. or less, for example, 150° C. or less, preferably 120° C. or less, for 2 hours or less, for example, 1 hour or less, preferably 30 minutes or less.

(14) The silver conductive material according to the above (13), wherein the silver conductive layer is patterned.

(15) A method for producing a silver conductive material comprising:

applying, onto a substrate, a silver coating composition comprising silver nano-particles produced by the method according to any one of the above (1) to (10) and an organic solvent, and then, calcining the silver coating composition to form a silver conductive layer. The calcining is performed at a temperature of 200° C. or less, for example, 150° C. or less, preferably 120° C. or less, for 2 hours or less, for example, 1 hour or less, preferably 30 minutes or less, more preferably 15 minutes or less. More specifically, the calcining is performed under conditions of about 90° C. to 120° C. and about 10 minutes to 15 minutes, for example, 120° C. and 15 minutes.

(16) The method for producing a silver conductive material according to the above (15), wherein the silver coating composition is applied in a pattern, and is then calcined to form a patterned silver conductive layer.

A method for producing metal nano-particles comprising:
mixing a metal compound with an aliphatic amine comprising at least a branched aliphatic hydrocarbon monoamine (D) comprising a branched aliphatic hydrocarbon group and one amino group, said branched aliphatic hydrocarbon group having 4 or more carbon atoms, to form a complex compound comprising the metal compound and the amine; and
thermally decomposing the complex compound by heating to form metal nano-particles.

Metal nano-particles produced by the above method.

Coated metal nano-particles whose surfaces are coated with a protective agent, wherein the protective agent comprises at least the branched aliphatic hydrocarbon amine (D).

Coated metal nano-particles whose surfaces are coated with a protective agent, wherein the protective agent comprises:
the branched aliphatic hydrocarbon amine (D); and
at least one of the linear aliphatic hydrocarbon monoamine (B) having 5 or less carbon atoms in total and the aliphatic hydrocarbon diamine (C).

Coated metal nano-particles whose surfaces are coated with a protective agent, wherein the protective agent comprises:
the branched aliphatic hydrocarbon amine (D):
at least one of the linear aliphatic hydrocarbon monoamine (B) having 5 or less carbon atoms in total and the aliphatic hydrocarbon diamine (C); and
the linear aliphatic hydrocarbon monoamine (A) having 6 or more carbon atoms in total.

A metal coating composition comprising the coated metal nano-particles and an organic solvent. The metal coating composition may take any form without any limitation. For example, a metal coating composition in which the metal nano-particles are dispersed in suspension state in the organic solvent, or a metal coating composition in which the metal nano-particles are dispersed in kneaded state in the organic solvent.

Effects of the Invention

In the present invention, a branched aliphatic hydrocarbon amine (D) is used as an aliphatic amine compound that functions as a complex-forming agent and/or a protective agent. The use of a branched aliphatic hydrocarbon amine compound makes it possible to coat a larger surface area of silver particles due to the steric factor of its branched aliphatic hydrocarbon group even when the amount of the branched aliphatic hydrocarbon amine compound attached to the surfaces of the silver particles is reduced, as compared to when a linear aliphatic hydrocarbon amine compound is used. Therefore, silver nano-particles can be properly stabilized even when the amount of the branched aliphatic hydrocarbon amine compound attached to the surfaces of the silver particles is reduced. The amount of a protective agent (organic stabilizer) that should be removed during calcining is reduced, and therefore the organic stabilizer can be efficiently removed even by low-temperature calcining at a temperature of 200° C. or less, thereby allowing the silver particles to be sufficiently sintered.

As described above, according to the present invention, it is possible to provide silver nano-particles that have excellent stability and can develop excellent conductivity (low resistance value) by calcining at a low temperature of 200° C. or less, for example, 150° C. or less, preferably 120° C. or less, and a short-time of 2 hours or less, for example, 1 hour or less, preferably 30 minutes or less; and a method for producing such silver nano-particles. In addition, according to the present invention, it is possible to provide a silver coating composition comprising the silver nano-particles in stable dispersion state in an organic solvent. Further, the present invention is also applied to a method for producing metal nano-particles containing a metal other than silver, and said metal nano-particles. According to the present invention, it is possible to form a conductive film or a conductive line even on any plastic substrate having low heat resistance such as a PET substrate or a polypropylene substrate. The present invention is effective at obtaining a calcined silver film having a low resistance value and a relatively large film thickness of, for example, 1 μm or more, preferably 3 μm or more, particularly 5 μm to 20 μm.

MODES FOR CARRYING OUT THE INVENTION

In the present invention, silver nano-particles are produced by:
mixing a silver compound with an aliphatic amine comprising at least a branched aliphatic hydrocarbon monoamine (D) comprising a branched aliphatic hydrocarbon group and one amino group, said branched aliphatic hydrocarbon group having 4 or more carbon atoms, to form a complex compound comprising the silver compound and the amine; and
thermally decomposing the complex compound by heating to form silver nano-particles.

In this description, the term "nano-particles" means that primary particles have a size (average primary particle diameter) of less than 1,000 nm. The particle size refers to the size of a particle not including a protective agent (a stabilizer) present on (coating) the surface of the particle (i.e., refers to the size of silver itself). In the present invention, the silver nano-particles have an average primary particle diameter of, for example, 0.5 nm to 100 nm, preferably 0.5 nm to 50 nm, more preferably 0.5 nm to 25 nm, even more preferably 0.5 nm to 20 nm.

The silver compound used in the present invention is one that is easily decomposed by heating to generate metallic silver. Examples of such a silver compound that can be used include: silver carboxylates such as silver formate, silver acetate, silver oxalate, silver malonate, silver benzoate, and silver phthalate; silver halides such as silver fluoride, silver chloride, silver bromide, and silver iodide; silver sulfate, silver nitrate, silver carbonate, and the like. In terms of the fact that metallic silver is easily generated by decomposition and impurities other than silver are less likely to be generated, silver oxalate is preferably used. Silver oxalate is advantageous in that silver oxalate has a high silver content, and metallic silver is directly obtained by thermal decomposition without the need for a reducing agent, and therefore impurities derived from a reducing agent are less likely to remain.

When metal nano-particles containing another metal other than silver are produced, a metal compound that is easily decomposed by heating to generate a desired metal is used instead of the silver compound. As such a metal compound, a metal salt corresponding to the above mentioned silver compound can be used. Examples of such a metal compound include: metal carboxylates; metal halides; and metal salt compounds such as metal sulfates, metal nitrates, and metal carbonates. Among them, in terms of the fact that a metal is easily generated by decomposition and impurities other than a metal are less likely to be generated, metal oxalate is preferably used. Examples of another metal include Al, Au, Pt, Pd, Cu, Co, Cr, In, and Ni.

Further, in order to obtain a composite with silver, the above mentioned silver compound and the above mentioned compound of another metal other than silver may be used in combination. Examples of another metal include Al, Au, Pt, Pd, Cu, Co, Cr, In, and Ni. The silver composite is composed of silver and one or more other metals, and examples thereof include Au—Ag, Ag—Cu, Au—Ag—Cu, Au—Ag—Pd, and the like. The amount of silver occupies at least 20 wt %, usually at least 50 wt %, for example, at least 80 wt % of the total amount of the metals.

In the present invention, at least the branched aliphatic hydrocarbon monoamine (D) is used as an aliphatic amine compound that functions as a complex-forming agent and/or a protective agent. The use of a branched aliphatic hydrocarbon amine compound makes it possible to coat a larger surface area of silver particles due to the steric factor of its branched aliphatic hydrocarbon group even when the amount of the branched aliphatic hydrocarbon amine compound attached to the surfaces of the silver particles is reduced, as compared to when a linear aliphatic hydrocarbon amine compound having the same carbon number is used. Therefore, silver nano-particles can be properly stabilized even when the amount of the branched aliphatic hydrocarbon amine compound attached to the surfaces of the silver particles is reduced. The amount of a protective agent (organic stabilizer) that should be removed during calcining is reduced, and therefore the organic stabilizer can be efficiently removed even by low-temperature calcining at a temperature of 200° C. or less, thereby allowing the silver particles to be sufficiently sintered.

The number of carbon atoms of the branched aliphatic hydrocarbon group in the branched aliphatic hydrocarbon monoamine (D) is 4 or more, for example, 4 to 16. The branched aliphatic hydrocarbon group needs to have 4 or more carbon atoms in order to obtain its steric factor. Examples of the branched aliphatic hydrocarbon monoamine compound include primary amines having 4 to 16 carbon atoms, preferably 4 to 8 carbon atoms, such as isobutylamine, sec-butylamine, tert-butylamine, isopentylamine, tert-pentylamine, isohexylamine, 2-ethylhexylamine, and tert-octylamine.

Other examples of the branched aliphatic hydrocarbon monoamine compound include secondary amines such as N,N-diisobutylamine, N,N-diisopentylamine, N,N-diisohexylamine, and N,N-(2-diethylhexyl)amine, and tertiary amines such as triisobutylamine, triisopentylamine, triisohexylamine, and tri(2-ethylhexyl)amine. In the case of N,N-(2-diethylhexyl)amine, the number of carbon atoms in 2-ethylhexyl group is 8, but the total number of carbon atoms contained in the amine compound (D) is 16. In the case of tri(2-ethylhexyl)amine, the total number of carbon atoms contained in the amine compound (D) is 24.

Among these branched aliphatic hydrocarbon monoamines, preferred are branched alkyl monoamine compounds whose main chain has 4 to 6 carbon atoms, such as isopentylamine, isohexylamine, and 2-ethylhexylamine. When the main chain has 4 to 6 carbon atoms, it is easy to properly stabilize silver nano-particles. Further, from the viewpoint of the steric factor of the branched aliphatic group, branching at the second carbon atom from the N-atom side is effective. The above-mentioned branched aliphatic monoamine compounds (D) may be used singly or in combination of two or more of them.

In the present invention, in addition to the branched aliphatic hydrocarbon monoamine (D), an aliphatic hydrocarbon amine compound selected from:

an aliphatic hydrocarbon monoamine (A) comprising a linear aliphatic hydrocarbon group and one amino group, said aliphatic hydrocarbon group having 6 or more carbon atoms in total;

an aliphatic hydrocarbon monoamine (B) comprising a linear aliphatic hydrocarbon group and one amino group, said aliphatic hydrocarbon group having 5 or less carbon atoms in total; and an aliphatic hydrocarbon diamine (C) comprising an aliphatic hydrocarbon group and two amino groups, said aliphatic hydrocarbon group having 8 or less carbon atoms in total, may further be used as the aliphatic hydrocarbon amine compound that functions as a complex-forming agent and/or a protective agent. These aliphatic hydrocarbon amine compounds (A), (B), and (C) may be used independently of one another. The linear aliphatic hydrocarbon monoamine (B) and the aliphatic hydrocarbon diamine (C) have the effect of promoting complex formation.

Although established, the "aliphatic hydrocarbon monoamine" in this description refers to a compound composed of one to three monovalent aliphatic hydrocarbon groups and one amino group. The "hydrocarbon group" refers to a group only composed of carbon and hydrogen. However, if necessary, each of the linear aliphatic hydrocarbon amine (A) and the linear aliphatic hydrocarbon amine (B) may have, on its hydrocarbon group, a substituent group containing a hetero atom (atom other than carbon and hydrogen) such as an oxygen atom or a nitrogen atom.

Further, the "aliphatic hydrocarbon diamine" refers to a compound composed of a bivalent aliphatic hydrocarbon group (alkylene group), two amino groups between which said aliphatic hydrocarbon group is interposed, and, if necessary, aliphatic hydrocarbon group(s) (alkyl group(s)) substituted for hydrogen atom(s) on the amino group(s). However, if necessary, the aliphatic hydrocarbon diamine (C) may have, on its hydrocarbon group (which is typically a linear hydrocarbon group), a substituent group containing a hetero atom (atom other than carbon and hydrogen) such as an oxygen atom or a nitrogen atom.

Based on the above term definitions, the branched aliphatic hydrocarbon monoamine (D), the linear aliphatic hydrocarbon monoamine (A), the linear aliphatic hydrocarbon monoamine (B), and the aliphatic hydrocarbon diamine (C) are different from one another in the present invention.

The linear aliphatic hydrocarbon monoamine (A) having 6 or more carbon atoms in total has, due to its linear hydrocarbon chain, high performance as a protective agent (a stabilizer) onto the surfaces of resulting silver particles.

The linear aliphatic hydrocarbon monoamine (A) includes a primary amine, a secondary amine, and a tertiary amine.

Examples of the primary amine include saturated linear aliphatic hydrocarbon monoamines (i.e., linear alkylmonoamines) such as n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, and n-octadecylamine. Other examples of the primary amine include unsaturated linear aliphatic hydrocarbon monoamines (i.e., linear alkenylmonoamines) such as oleylamine.

Examples of the secondary amine include dialkylmonoamines such as N,N-di(n-propyl)amine, N,N-di(n-butyl)amine, N,N-di(n-pentyl)amine, N,N-di(n-hexyl)amine, N,N-di(n-peptyl)amine, N,N-di(n-octyl)amine, N,N-di(n-nonyl)amine, N,N-di(n-decyl)amine, N,N-di(n-undecyl)amine, N,N-di(n-dodecyl)amine, N-methyl-N-(n-propyl)amine, N-ethyl-N-(n-propyl)amine, and N-(n-propyl)-N-(n-butyl)amine. Examples of the tertiary amine include tri(n-butyl)amine, tri(n-hexyl)amine, and the like.

Among them, saturated linear aliphatic hydrocarbon monoamines having 6 or more carbon atoms are preferred. When the number of carbon atoms is 6 or more, space can be secured between silver particles by adsorption of amino groups to the surfaces of the silver particles, thereby improving the effect of preventing agglomeration of the silver particles. The upper limit of the number of carbon atoms is not particularly limited, but saturated aliphatic monoamines having up to 18 carbon atoms are usually preferred in consideration of ease of availability, ease of removal during calcining, etc. Particularly, alkylmonoamines having 6 to 12 carbon atoms such as n-hexylamine, n-heptylamine, n-octylamine, n-nonylamine, n-decylamine, n-undecylamine, and n-dodecylamine are preferably used. The above-mentioned linear aliphatic hydrocarbon monoamines (A) may be used singly or in combination of two or more of them.

The linear aliphatic hydrocarbon monoamine (B) having 5 or less carbon atoms in total has a shorter carbon chain than the linear aliphatic monoamine (A) having 6 or more carbon atoms in total, and therefore the function of the aliphatic hydrocarbon monoamine (B) itself as a protective agent (a stabilizer) is considered to be low. However, the aliphatic hydrocarbon monoamine (B) has a high ability to coordinate to silver in the silver compound due to its higher polarity than the aliphatic monoamine (A), and is therefore considered to have the effect of promoting complex formation. In addition, the aliphatic hydrocarbon monoamine (B) has a short carbon chain, and therefore can be removed from the surfaces of silver particles in a short time of 30 minutes or less, or 20 minutes or less, even by low-temperature calcining at a temperature of, for example, 120° C. or less, or about 100° C. or less, which is effective for low-temperature calcining of resulting silver nano-particles.

Examples of the linear aliphatic hydrocarbon monoamine (B) include saturated linear aliphatic hydrocarbon monoamines (i.e., linear alkylmonoamines) having 2 to 5 carbon atoms such as ethylamine, n-propylamine, n-butylamine, and n-pentylamine. Other examples of the linear aliphatic hydrocarbon monoamine (B) include dialkylmonoamines such as N,N-dimethylamine and N,N-diethylamine.

Among them, n-butylamine, n-pentylamine, and the like are preferred, and n-butylamine is particularly preferred. The above-mentioned aliphatic hydrocarbon monoamines (B) may be used singly or in combination of two or more of them.

The aliphatic hydrocarbon diamine (C) having 8 or less carbon atoms in total has a high ability to coordinate to silver in the silver compound, and therefore has the effect of promoting complex formation. Generally, aliphatic hydrocarbon diamines have higher polarity than aliphatic hydrocarbon monoamines, and therefore have a high ability to coordinate to silver in a silver compound. Further, the aliphatic hydrocarbon diamine (C) has the effect of promoting lower-temperature and shorter-time thermal decomposition in the thermal-decomposition step of the complex compound, and therefore production of silver nano-particles can be more efficiently conducted. Further, a protective film containing the aliphatic diamine (C) on silver particles has high polarity, which improves the dispersion stability of the silver particles in a dispersion medium comprising a highly-polar solvent. Furthermore, the aliphatic diamine (C) has a short carbon chain (which is typically a linear hydrocarbon group), and therefore can be removed from the surfaces of silver particles in a short time of 30 minutes or less, or 20 minutes or less, even by low-temperature calcining at a temperature of, for example, 120° C. or less, or about 100° C. or less, which is effective for low-temperature and short-time calcining of resulting silver nano-particles.

The aliphatic hydrocarbon diamine (C) is not particularly limited, and examples thereof include ethylenediamine, N,N-dimethylethylenediamine, N,N'-dimethylethylenediamine, N,N-diethylethylenediamine, N,N'-diethylethylenediamine, 1,3-propanediamine, 2,2-dimethyl-1,3-propanediamine, N,N-dimethyl-1,3-propanediamine, N,N'-dimethyl-1,3-propanediamine, N,N-diethyl-1,3-propanediamine, N,N'-diethyl-1,3-propanediamine, 1,4-butanediamine, N,N-dimethyl-1,4-butanediamine, N,N'-dimethyl-1,4-butanediamine, N,N-diethyl-1,4-butanediamine, N,N'-diethyl-1,4-butanediamine, 1,5-pentanediamine, 1,5-diamino-2-methylpentane, 1,6-hexanediamine, N,N-dimethyl-1,6-hexanediamine, N,N'-dimethyl-1,6-hexanediamine, 1,7-heptanediamine, 1,8-octanediamine, and the like. They are all alkylenediamines having 8 or less carbon atoms in total in which at least one of the two amino groups is a primary amino group or a secondary amino group, and have a high ability to coordinate to silver in the silver compound, and therefore have the effect of promoting complex formation. In the present invention, the above linear aliphatic hydrocarbon diamines are exemplified.

Among them, N,N-dimethylethylenediamine, N,N-diethylethylenediamine, N,N-dimethyl-1,3-propanediamine, N,N-diethyl-1,3-propanediamine, N,N-dimethyl-1,4-butanediamine, N,N-diethyl-1,4-butanediamine, N,N-dimethyl-1,6-hexanediamine, and the like are preferred, which are alkylenediamines having 8 or less carbon atoms in total in which one of the two amino groups is a primary amino group ($-NH_2$) and the other is a tertiary amino group ($-NR^1R^2$). Such preferred alkylenediamines are represented by the following structural formula:

$$R^1R^2N-R-NH_2$$

wherein R represents a bivalent alkylene group, $R^1$ and $R^2$ may be the same or different from each other and each represent a linear alkyl group, and the total number of carbon atoms of R, $R^1$, and $R^2$ is 8 or less. The alkylene group does not usually contain a hetero atom (atom other than carbon and hydrogen) such as an oxygen atom or a nitrogen atom, but if necessary, may have a substituent group containing such a hetero atom. Further, the alkyl group does not usually contain a hetero atom such as an oxygen atom or a nitrogen atom, but if necessary, may have a substituent group containing such a hetero atom.

When one of the two amino groups is a primary amino group, the ability to coordinate to silver in the silver compound is high, which is advantageous for complex formation, and when the other is a tertiary amino group, a resulting complex is prevented from having a complicated network structure because a tertiary amino group has a poor ability to coordinate to a silver atom. If a complex has a complicated network structure, there is a case where the thermal-decomposition step of the complex requires a high temperature. Among these diamines, those having 6 or less carbon atoms in total are preferred, and those having 5 or less carbon atoms in total are more preferred in terms of the fact that they can be removed from the surfaces of silver particles in a short time even by low-temperature calcining. The above-mentioned aliphatic hydrocarbon diamines (C) may be used singly or in combination of two or more of them.

In the present invention, the branched aliphatic hydrocarbon monoamine (D) may be contained in an amount of, for example, 10 mol % to 50 mol % on the basis of the total amount of the aliphatic amines. The balance may be occupied by other amine components [(A), (B), (C)]. As compared to the other amine components [(A), (B), (C)], the branched amine (D) can coat a larger surface area of silver particles due to its steric factor even when the amount of the branched amine (D) attached to the surfaces of the silver particles is reduced. The use of the branched amine (D) in such an amount makes it possible to coat a larger surface area of silver particles due to its steric factor even when the amount of the branched amine (D) attached to the surfaces of the silver particles is reduced, and therefore silver nanoparticles are properly stabilized. Further, the amount of a protective agent (organic stabilizer) that should be removed during calcining is reduced, and therefore the organic stabilizer can be efficiently removed even by low-temperature calcining at a temperature of 200° C. or less, thereby allowing the silver particles to be sufficiently sintered. If the amount of the branched amine (D) used is less than 10 mol %, the effect of coating the surfaces of silver particles is poorly obtained. The lower limit of the amount used is preferably 10 mol % or more, more preferably 15 mol % or more. On the other hand, the upper limit of the amount of the branched amine (D) used may exceed 50 mol %, but if the amount used exceeds 50 mol %, there is a case where it takes a long time to form a complex.

In the present invention, in addition to the branched aliphatic hydrocarbon monoamine (D), an aliphatic amine selected from the linear aliphatic hydrocarbon monoamine (A) having 6 or more carbon atoms in total (C6+), the linear aliphatic hydrocarbon monoamine (B) having 5 or less carbon atoms in total (C5−), and the aliphatic hydrocarbon diamine (C) having 8 or less carbon atoms in total may be used as the aliphatic amine. These aliphatic amines (A), (B), and (C) may be used independently of one another. The linear aliphatic hydrocarbon monoamine (B) and the aliphatic hydrocarbon diamine (C) have the effect of promoting complex formation, and therefore at least one of the components (B) and (C) is preferably used.

Specifically, the aliphatic amine used in the present invention may be any one of the following combinations of amine components.

(D)+(B)
(D)+(C)
(D)+(B)+(C)
(D)+(B)+(A)
(D)+(C)+(A)
(D)+(B)+(C)+(A)
(D)+(A)

The ratio between/among the amine components used may be appropriately determined in consideration of the above-described functions of these amine components. For example, when the (C5−) linear monoamine (B) is used in addition to the branched amine (D), for example, the amount of the branched monoamine (D) may be 10 mol % to 50 mol %, and
the amount of the (C5−) linear monoamine (B) may be 50 mol % to 90 mol %; or
the amount of the branched monoamine (D) may be 20 mol % to 50 mol %, and
the amount of the (C5−) linear monoamine (B) may be 50 mol % to 80 mol %,
on the basis of the total amount of the aliphatic amines [(D)+(B)] (100%).

By setting the content of the aliphatic monoamine (B) to 50 mol % to 90 mol %, the complex-forming effect of the component (B) is easily obtained, and the component (B) itself can contribute to low-temperature and short-time calcining.

For example, when the aliphatic diamine (C) is used in addition to the branched amine (D), for example, the amount of the branched monoamine (D) may be 10 mol % to 50 mol %, and
the amount of the aliphatic diamine (C) may be 50 mol % to 90 mol %; or
the amount of the branched monoamine (D) may be 20 mol % to 50 mol %, and
the amount of the aliphatic diamine (C) may be 50 mol % to 80 mol %,
on the basis of the total amount of the aliphatic amines [(D)+(C)] (100%).

By setting the content of the aliphatic diamine (C) to 50 mol % to 90 mol %, the complex-forming effect of the component (C) is easily obtained, and the component (C) itself can contribute to low-temperature and short-time calcining.

For example, when the (C6+) linear monoamine (A) and the (C5−) linear monoamine (B) are used in addition to the branched amine (D), for example, the amount of the branched monoamine (D) may be 10 mol % to 50 mol %,
the amount of the (C6+) linear monoamine (A) may be 5 mol % to 60 mol %, and
the amount of the (C5−) linear monoamine (B) may be 30 mol % to 85 mol %,
on the basis of the total amount of the aliphatic amines [(D)+(A)+(B)] (100%).

By setting the content of the aliphatic monoamine (A) to 5 mol % to 60 mol %, the carbon chain of the component (A) can easily fulfill its function of protecting and stabilizing the surfaces of resulting silver particles. If the content of the component (A) is less than 5 mol %, there is a case where the protective and stabilization function of the component (A) is poorly developed. On the other hand, it is sufficient that the content of the component (A) is 60 mol % or less, because the protective and stabilization function of the branched amine (D) is obtained. If the content of the component (A) exceeds 60 mol %, the component (A) is poorly removed by low-temperature calcining. The content of the component (A) may be 5 mol % to 50 mol %. By setting the content of the aliphatic monoamine (B) to 30 mol % to 85 mol %, the complex-forming effect of the component (B) is easily obtained, and the component (B) itself can contribute to low-temperature and short-time calcining.

For example, when the (C6+) linear monoamine (A) and the aliphatic diamine (C) are used in addition to the branched amine (D), for example, the amount of the branched monoamine (D) may be 10 mol % to 50 mol %, the amount of the (C6+) linear monoamine (A) may be 5 mol % to 60 mol %, and the amount of the aliphatic diamine (C) may be 30 mol % to 85 mol %, on the basis of the total amount of the aliphatic amines [(D)+(A)+(C)] (100%).

When both the (C5−) linear monoamine (B) and the aliphatic diamine (C) are used, the total amount of them may be the above amount of (B) or (C).

The above ratios among/between the branched aliphatic monoamine (D), the optional aliphatic monoamine (A), the optional aliphatic monoamine (B) and/or the optional aliphatic diamine (C) used are examples and may be changed in various manners.

In the present invention, the total amount of the aliphatic amine components [(D)+the optional component (A)+the optional component (B)+the optional component (C)] is not particularly limited, but may be about 1 to 50 moles as represented by the total amount of the amine components, per 1 mole of silver atoms in the silver compound as a starting material. If the total amount of the amine components [(D)+the optional component (A)+the optional component (B)+the optional component (C)] is less than 1 mole per 1 mole of the silver atoms, there is a possibility that part of the silver compound remains without being converted to a complex compound in the complex compound-forming step so that, in the subsequent thermal decomposition step, silver particles have poor uniformity and become enlarged or the silver compound remains without being thermally decomposed. On the other hand, it is considered that even when the total amount of the amine components [(D)+the optional component (A)+the optional component (B)+the optional component (C)] exceeds about 50 moles per 1 mole of the silver atoms, there are few advantages. In order to produce a dispersion liquid of silver nano-particles in substantial non-solvent reaction system, the total amount of the amine components may be, for example, about 2 moles or more per 1 mole of the silver atoms. By setting the total amount of the amine components to about 2 to 50 moles, the complex compound-forming step and the thermal-decomposition step of the complex compound can be successfully performed. The lower limit of the total amount of the amine components is preferably 2 moles or more, more preferably 6 moles or more per 1 mole of silver atoms in the silver compound. It is to be noted that the molecule of silver oxalate contains two silver atoms.

In the present invention, an aliphatic carboxylic acid (E) may further be used as a stabilizer to further improve the dispersibility of silver nano-particles in a dispersion medium. The aliphatic carboxylic acid (E) may be used together with the above-described amines, and may be used by adding to the liquid amine mixture. The use of the aliphatic carboxylic acid (E) may improve the stability of silver nano-particles, especially the stability of silver nano-particles in a coating material state where the silver nano-particles are dispersed in an organic solvent.

As the aliphatic carboxylic acid (E), a saturated or unsaturated aliphatic carboxylic acid is used. Examples of the aliphatic carboxylic acid include saturated aliphatic monocarboxylic acids having 4 or more carbon atoms such as butanoic acid, pentanoic acid, hexanoic acid, heptanoic acid, octanoic acid, nonanoic acid, decanoic acid, undecanoic dodecanoic acid, tridecanoic acid, tetradecanoic acid, pentadecanoic acid, hexadecanoic acid, heptadecanoic acid, octadecanoic acid, nonadecanoic acid, icosanoic acid, and eicosenoic acid; and unsaturated aliphatic monocarboxylic acids having 8 or more carbon atoms such as oleic acid, elaidic acid, linoleic acid, and palmitoleic acid.

Among them, saturated or unsaturated aliphatic monocarboxylic acids having 8 to 18 carbon atoms are preferred. When the number of carbon atoms is 8 or more, space can be secured between silver particles by adsorption of carboxylic groups to the surfaces of the silver particles, thereby improving the effect of preventing agglomeration of the silver particles. In consideration of ease of availability, ease of removal during calcining, etc., saturated or unsaturated aliphatic monocarboxylic compounds having up to 18 carbon atoms are usually preferred. Particularly, octanoic acid, oleic acid, and the like are preferably used. The abovementioned aliphatic carboxylic acids (E) may be used singly or in combination of two or more of them.

When the aliphatic carboxylic acid (E) is used, the amount of the aliphatic carboxylic acid (E) used may be, for example, about 0.05 to 10 moles, preferably 0.1 to 5 moles, more preferably 0.5 to 2 moles per 1 mole of silver atoms in the silver compound as a starting material. If the amount of the component (E) is less than 0.05 moles per 1 mole of the silver atoms, the effect of improving dispersion stability obtained by adding the component (E) is poor. On the other hand, if the amount of the component (E) reaches 10 moles, the effect of improving dispersion stability is saturated and the component (E) is poorly removed by low-temperature calcining. It is to be noted that the aliphatic carboxylic acid (E) does not necessarily need to be used.

A method for producing silver nano-particles according to the present invention mainly includes:

the step of mixing a silver compound with an aliphatic amine comprising the branched aliphatic hydrocarbon monoamine (D) and comprising, as an optional component(s), the amine component (A) and/or the amine component (B) and/or the amine component (C) to form a complex compound comprising the silver compound and the amines (complex compound-forming step); and the step of thermally decomposing the complex compound by heating (thermal-decomposition step of complex compound).

In the complex compound-forming step, first, a mixture liquid of the aliphatic amine components [(D)+optional component (A)+optional component (B)+optional component (C)] may be prepared, and then a silver compound may be mixed with the amine mixture liquid in the substantial absence of solvent to form a complex compound comprising the silver compound and the amines. The amine mixture liquid can be prepared by stirring the amine (D) and the optional component (A), the optional component (B), and/or the optional component (C), and if used, the carboxylic acid component (E) in a predetermined ratio at room temperature [preparation step for amine mixture liquid]. These amine components may be mixed with the silver compound sequentially without using a mixture liquid thereof.

When metal nano-particles containing another metal other than silver are produced, a metal compound containing a desired metal is used instead of the silver compound.

The silver compound (or the metal compound) in powder form, and a given amount of the amine mixture liquid are mixed. At this time, the mixing may be performed by stirring them at a room temperature, or may be performed by stirring them while a mixture of them is appropriately cooled to a room temperature or less because the coordination reaction of the amines to the silver compound (or the metal compound) is accompanied by heat generation. The excess amines function as a reaction medium. When a complex compound is formed, the formed complex compound generally exhibits a color corresponding to its components, and therefore the endpoint of a complex compound-forming reaction can be determined by detecting the end of a change in the color of a reaction mixture by an appropriate spectroscopic method or the like. A complex compound formed from silver oxalate is generally colorless (appears white to our eyes), but even in such a case, it is possible to determine the state of formation of a complex compound based on a change in the form of a reaction mixture such as a change in viscosity. In this way, a silver-amine complex (or a metal-amine complex) is obtained in a medium mainly containing the amines.

Alternatively, in the complex compound-forming step, first, a mixture liquid of the aliphatic amine components [(D)+optional component (A)+optional component (B)+optional component (C)] may be prepared, and then a silver compound may be mixed with the amine mixture liquid in the presence of a reaction solvent to form a complex compound comprising the silver compound and the amines. The reaction solvent used may be, for example, an alcohol having 3 or more carbon atoms, preferably an alcohol having 3 or more and 10 or less carbon atoms. Preferred examples of the alcohol include 1-butanol, isobutanol, sec-butanol, tert-butanol, 1-pentanol, 1-hexanol, 1-octanol, 2-ethylhexanol, 2-octanol and the like. The use of the reaction solvent makes it possible to easily mix the silver compound in powder form and the amines with stirring, and to mildly and safely perform the exothermic reaction. These amine components maybe mixed with the silver component sequentially without using a mixture thereof.

Alternatively, in the complex compound-forming step, first, a silver compound may be mixed with an alcohol solvent to obtain a silver compound-alcohol slurry, and then the obtained silver compound-alcohol slurry may be mixed with a mixture liquid of the aliphatic amine components [(D)+optional component (A)+optional component (B)+optional component (C)] to form a complex compound comprising the silver compound and the amines. The alcohol solvent used may be those mentioned above. By obtaining a silver compound-alcohol slurry from the silver compound in powder form, it is possible to improve the handleability of the silver compound, to easily mix the silver compound-alcohol slurry and the amines with stirring, and to mildly and safely perform the exothermic reaction. These amine components may be mixed with the silver compound sequentially without using a mixture thereof.

Then, the obtained complex compound is thermally decomposed by heating to form silver nano-particles [thermal-decomposition step of complex compound]. When a metal compound containing another metal other than silver is used, desired metal nano-particles are formed. The silver nano-particles (metal nano-particles) are formed without using a reducing agent. However, if necessary, an appropriate reducing agent may be used without impairing the effects of the present invention.

In such a metal-amine complex decomposition method, the amines generally play a role in controlling the mode of formation of fine particles by agglomeration of an atomic metal generated by decomposition of the metal compound, and in forming film on the surfaces of the formed metal fine particles to prevent reagglomeration of the fine particles. That is, it is considered that when the complex compound of the metal compound and the amine is heated, the metal compound is thermally decomposed to generate an atomic metal while the coordination bond of the amine to a metallic atom is maintained, and then the metallic atoms coordinated with the amine are agglomerated to form metal nano-particles coated with an amine protective film.

At this time, the thermal decomposition is preferably performed by stirring the complex compound in a reaction medium mainly containing the amines, or in the above-mentioned alcohol reaction medium. The thermal decomposition may be performed in a temperature range in which coated silver nano-particles (or coated metal nano-particles) are formed, but from the viewpoint of preventing the elimination of the amine from the surfaces of silver particles (or from the surfaces of metal particles), the thermal decomposition is preferably performed at a temperature as low as possible within such a temperature range. In case of the complex compound from silver oxalate, the thermal decomposition temperature may be, for example, about 80° C. to 120° C., preferably about 95° C. to 115° C., more specifically about 100° C. to 110° C. In case of the complex compound from silver oxalate, heating at about 100° C. allows decomposition and reduction of silver ions to occur so that coated silver nano-particles can be obtained. Further, the thermal decomposition of silver oxalate itself generally occurs at about 200° C. The reason why the thermal decomposition temperature of a silver oxalate-amine complex compound is about 100° C. lower than that of silver oxalate itself is not clear, but it is estimated that a coordination polymer structure formed by pure silver oxalate is broken by forming a complex compound of silver oxalate with the amine.

Further, the thermal decomposition of the complex compound is preferably performed in an inert gas atmosphere such as argon, but may be performed in the atmosphere.

When the complex compound is thermally decomposed, a suspension exhibiting a glossy blue color is obtained. Then, the excess amines, etc. are removed from the suspension by, for example, sedimentation of silver nano-particles (or metal nano-particles) and decantation and washing with an appropriate solvent (water or an organic solvent) to obtain desired stable coated silver nano-particles (or coated metal nano-particles). After the washing, the coated silver nano-particles are dried to obtain a powder of the desired stable coated silver nano-particles (or coated metal nano-particles).

The decantation and washing are performed using water or an organic solvent. Examples of the organic solvent that may be used include aliphatic hydrocarbon solvents such as pentane, hexane, heptane, octane, nonane, decane, undecane, dodecane, tridecane, and tetradecane; alicyclic hydrocarbon solvents such as cyclohexane and methylcyclohexane; aromatic hydrocarbon solvents such as toluene, xylene, and mesitylene; alcohol solvents such as methanol, ethanol, propanol, and butanol; acetonitrile; and mixed solvents of them.

The method according to the present invention does not require the use of a reducing agent. Therefore, a by-product derived from a reducing agent is not formed, coated silver nano-particles are easily separated from a reaction system, and high-purity coated silver nano-particles are obtained. However, if necessary, an appropriate reducing agent may be used without impairing the effects of the present invention.

A silver coating composition can be prepared using the obtained silver nano-particles. The silver coating composition can take any form without any limitation. For example, a silver coating composition called "silver ink" can be prepared by dispersing the silver nano-particles in suspension state in an appropriate organic solvent (dispersion medium). Alternatively, a silver coating composition called "silver paste" can be prepared by dispersing the silver nano-particles in kneaded state in an organic solvent.

Examples of the organic solvent used to obtain a silver coating composition include: aliphatic hydrocarbon solvents such as pentane, hexane, heptane, octane, nonane, decane, undecane, dodecane, tridecane, and tetradecane; alicyclic hydrocarbon solvents such as cyclohexane and methylcyclohexane; aromatic hydrocarbon solvents such as toluene, xylene, and mesitylene; and alcohol solvents such as methanol, ethanol, propanol, n-butanol, n-pentanol, n-hexanol, n-heptanol, n-octanol, n-nonanol, and n-decanol. Examples of the organic solvent used to obtain a silver paste as a silver coating composition include terpene-based solvents such as terpineol and dihydroterpineol. The kind and amount of organic solvent used may be appropriately determined depending on a desired concentration or viscosity of the silver coating composition (silver ink, silver paste). The same goes for the metal nano-particles.

The silver nano-particle powder and the silver coating composition obtained in the present invention have excellent stability. For example, the silver nano-particle powder is stable during storage at a room temperature for 1 month or more. The silver coating composition is stable at a silver concentration of, for example, 50 wt % at a room temperature for 1 month or more without the occurrence of agglomeration and fusion.

According to the present invention, silver nano-particles (or metal nano-particles) whose surfaces are coated with a protective agent are obtained. The protective agent contains the branched aliphatic hydrocarbon monoamine (D), and further contains, as an optional component(s), the linear aliphatic hydrocarbon monoamine (A) having 6 or more carbon atoms in total, the linear aliphatic hydrocarbon monoamine (B) having 5 or less carbon atoms in total, and/or the aliphatic hydrocarbon diamine (C) having 8 or less carbon atoms in total, and/or the aliphatic carboxylic acid (E).

The prepared silver coating composition is applied onto a substrate and is then calcined.

The application can be performed by a known method such as spin coating, inkjet printing, screen printing, dispenser printing, relief printing (flexography), dye sublimation printing, offset printing, laser printer printing (toner printing), intaglio printing (gravure printing), contact printing, or microcontact printing. By using such a printing technique, a patterned silver coating composition layer is obtained, and a patterned silver conductive layer is obtained by calcining.

The calcining can be performed at 200° C. or less, for example, a room temperature (25° C.) or more and 150° C. or less, preferably a room temperature (25° C.) or more and 120° C. or less. However, in order to complete the sintering of silver by short-time calcining, the calcining may be performed at a temperature of 60° C. or more and 200° C. or less, for example, 80° C. or more and 150° C. or less, preferably 90° C. or more and 120° C. or less. The time of calcining may be appropriately determined in consideration of the amount of a silver ink applied, the calcining temperature, etc., and may be, for example, several hours (e.g., 3 hours, or 2 hours) or less, preferably 1 hour or less, more preferably 30 minutes or less, even more preferably 10 minutes to 20 minutes, more specifically 10 minutes to 15 minutes.

The silver nano-particles on as have such a constitution as described above, and are therefore sufficiently sintered even by such low-temperature and short-time calcining. As a result, excellent conductivity (low resistance value) is developed. A silver conductive layer having a low resistance value (e.g., 15 μΩcm or less, in the range of 7 to 15 μΩcm) is formed. The resistance value of bulk silver is 1.6 μΩcm.

Since the calcining can be performed at a low temperature, not only a glass substrate or a heat-resistant plastic substrate such as a polyimide-based film but also a general-purpose plastic substrate having low heat resistance, such as a polyester-based film, e.g., a polyethylene terephthalate (PET) film and a polyethylene naphthalate (PEN) film, or a polyolefin-based film, e.g., polypropylene film, can be suitably used as a substrate. Further, short-time calcining reduces the load on such a general-purpose plastic substrate having low heat resistance, and improves production efficiency.

The silver conductive material according to the present invention can be applied to electromagnetic wave control materials, circuit boards, antennas, radiator plates, liquid crystal displays, organic EL displays, field emission displays (FEDs), IC cards, IC tags, solar cells, LED devices, organic transistors, condensers (capacitors), electronic paper, flexible batteries, flexible sensors, membrane switches, touch panels, EMI shields, and the like.

The thickness of the silver conductive layer may be appropriately determined depending on the intended use. Particularly, the use of the silver nano-particles according to the present invention makes it possible, even when a silver conductive layer having a relatively large film thickness is formed, for the silver conductive layer to have high conductivity. The thickness of the silver conductive layer may be selected from the range of, for example, 5 nm to 30 μm, preferably 100 nm to 25 μm, more preferably 500 nm to 20 μm.

The present invention has been described above with reference mainly to silver nano-particles, but is applied also to a method for producing metal nano-particles containing a metal other than silver and said metal nano-particles.

EXAMPLES

Hereinafter, the present invention will be described more specifically with reference to examples, but is not limited to these examples.

[Specific Resistance Value of Calcined Silver Film]

The specific resistance value of an obtained calcined silver film was measured by a four-terminal method (Loresta GP MCP-T610). The measuring limit of this device is $10^7$ Ωcm.

Reagents used in Examples and Comparative Examples are as follows:

2-Ethylhexylamine (MW: 129.25): reagent manufactured by Wako Pure Chemical Industries, Ltd.;
n-Butylamine (MW: 73.14): reagent manufactured by Tokyo Chemical Industry Co., Ltd.;
n-Hexylamine (MW: 101.19): reagent manufactured by Tokyo Chemical Industry Co., Ltd.;
n-Octylamine (MW: 129.25): reagent manufactured by Tokyo Chemical Industry Co., Ltd.;
Methanol: special grade reagent manufactured by Wako Pure Chemical Industries, Ltd.;
1-Butanol: special grade reagent manufactured by Wako Pure Chemical Industries, Ltd.;
Dihydroterpineol: manufactured by Nippon Terpene Chemicals; Silver oxalate (MW: 303.78): synthesized from silver nitrate (manufactured by Wako Pure Chemical Industries, Ltd.) and oxalic acid dihydrate (manufactured by Wako Pure Chemical Industries, Ltd.).

Example 1

(Preparation of Silver Nano-particles)

In a 100-mL flask, 3.0 g (9.9 mmol) of silver oxalate was placed, and then 4.5 g of 1-butanol was added and the resulting mixture was stirred at a room temperature to prepare a slurry of silver oxalate in 1-butanol.

An amine mixture liquid of 8.67 g (118.5 mmol) of n-butylamine, 3.83 g (29.6 mmol) of 2-ethylhexylamine, and 1.28 g (9.90 mmol) of n-octylamine was dropped into the slurry of silver oxalate in 1-butanol at 30° C. After the completion of the dropping, the resulting mixture was stirred at 30° C. for 1 hour to allow a complex-forming reaction of silver oxalate with amine to proceed, thereby forming a white substance (silver oxalate-amine complex).

After the silver oxalate-amine complex was formed, the reaction mixture was heated to 100° C. with stirring to thermally decompose the silver oxalate-amine complex. As a result, a suspension was obtained in which deep blue silver nano-particles were suspended in the amine mixture liquid.

Then, the obtained suspension was cooled, and 9 g of methanol was added thereto with stirring, and then the silver nano-particles were spun down by centrifugation to remove a supernatant. Then, 9 g of 1-butanol was again added to the silver nano-particles with stirring, and then the silver nano-particles were spun down by centrifugation to remove a supernatant. In this way, wet silver nano-particles were obtained.

(Preparation and Calcining of Nano-silver Coating Material)

Then, dihydroterpineol was added to the wet silver nano-particles so that a silver concentration was 70 wt %, and the resulting mixture was kneaded to prepare a silver nano-particle paste.

The obtained silver nano-particle paste was applied onto an alkali-free glass plate by an applicator to form a coating film whose film thickness after calcining was about 10 μm. After being formed, the coating film was immediately calcined in a fan drying oven in a condition at 120° C. for 15 minutes to form a calcined silver film. The specific resistance value of the obtained calcined silver film was measured by a four-terminal method and found to be 7.0 μΩcm.

(Regarding Silver Oxalate-amine Complex)

The white substance obtained in the process of preparing silver nano-particles was analyzed by a DSC (differential scanning calorimeter), and as a result, its average exothermic onset temperature by thermal decomposition was 102.5° C. On the other hand, silver oxalate as a starting material was also analyzed by a DSC similarly, and as a result, its average exothermic onset temperature by thermal decomposition was 218° C. That is, the white substance obtained in the process of preparing silver nano-particles had a lower thermal decomposition temperature than silver oxalate as a starting material. The results indicate that the white substance obtained in the process of preparing silver nano-particles was a material obtained by bonding between silver oxalate and the alkylamine, and the white substance was estimated to be a silver oxalate-amine complex in which the amino group of the alkylamine was coordinated to a silver atom in silver oxalate.

The DSC analysis was performed under the following conditions:

Device: DSC 6220-ASD2 (manufactured by SII Nanotechnology Inc.);
Sample container: 15-μL gold-plated sealed cell (manufactured by SII Nanotechnology Inc.);
Temperature rise rate: 10° C./min (room temperature to 600° C.);
Atmosphere gas inside the cell: air filled at atmospheric pressure; and
Atmosphere gas outside the cell: nitrogen stream (50 mL/min).

In addition, the IR spectrum of the white substance obtained in the process of preparing silver nano-particles was measured, and as a result, absorption derived from the alkyl group of the alkylamine was observed (at about 2,900 $cm^{-1}$ and 1,000 $cm^{-1}$). The result also indicates that the viscous white substance obtained in the process of preparing silver nano-particles was a material obtained by bonding between silver oxalate and the alkylamine, and the white substance was estimated to be a silver oxalate-amine complex in which an amino group was coordinated to a silver atom in silver oxalate.

Example 2

A printing test was performed by a screen printer using the silver nano-particle paste prepared in Example 1. A printing plate was designed to achieve a line width of 100 μm, and as a result, lines with an average width of 99.9 μm could be drawn.

Example 3

A silver nano-particle paste was prepared in the same manner as in Example 1 except that the composition of the amine mixture liquid in preparation of silver nano-particles was changed as follows: 10.84 g (148.1 mmol) of n-butylamine, 3.83 g (29.6 mmol) of 2-ethylhexylamine, and 1.28 g (9.90 mmol) of n-octylamine. The paste was applied onto an alkali-free glass plate by an applicator, and then, a coating film was formed and calcined in the same manner as in Example 1.

After being formed, the coating film was immediately calcined in a fan drying oven in a condition at 120° C. for 15 minutes to form a calcined silver film. The specific resistance value of the obtained calcined silver film was measured by a four-terminal method and found to be 7.2 μΩcm.

Example 4

A silver nano-particle paste was prepared in the same manner as in Example 1 except that the composition of the amine mixture liquid in preparation of silver nano-particles was changed as follows: 10.84 g (148.1 mmol) of n-butylamine, 3.00 g (29.6 mmol) of n-hexylamine, and 3.83 g (29.6 mmol) of 2-ethylhexylamine. The paste was applied onto an alkali-free glass plate by an applicator, and then, a coating film was formed and calcined in the same manner as in Example 1.

[1] After being formed, the coating film was immediately calcined in a fan drying oven in a condition at 120° C. for 15 minutes to form a calcined silver film. The specific resistance value of the obtained calcined silver film was measured by a four-terminal method and found to be 8.3 μΩcm.

[2] Further, separately, after being formed, the coating film was immediately calcined in a fan drying oven in a condition at 220° C. for 5 minutes to form a calcined silver film. The specific resistance value of the obtained calcined silver film was measured by a four-terminal method and found to be 3.0 μΩcm

Comparative Example 1

A silver nano-particle paste was prepared in the same manner as in Example 1 except that the composition of the amine mixture liquid in preparation of silver nano-particles was changed as follows: 10.84 g (148.1 mmol) of n-butylamine, 3.00 g (29.6 mmol) of n-hexylamine, and 1.28 g (9.90 mmol) of n-octylamine. The paste was applied onto an alkali-free glass plate by an applicator, and then, a coating film was formed and calcined in the same manner as in Example 1.

After being formed, the coating film was immediately calcined in a fan drying oven in a condition at 120° C. for 15 minutes to form a calcined silver film. The specific resistance value of the obtained calcined silver film was measured by a four-terminal method and found to be 14.2 μΩcm.

Comparative Example 2

A silver nano-particle paste was prepared in the same manner as in Example 1 except that the composition of the amine mixture liquid in preparation of silver nano-particles was changed as follows: 10.84 g (148.1 mmol) of n-butylamine, 3.00 g (29.6 mmol) of n-hexylamine, and 3.83 g (29.6 mmol) of n-octylamine. The paste was applied onto an alkali-free glass plate by an applicator, and then, a coating film was formed and calcined in the same manner as in Example 1.

[1] After being formed, the coating film was immediately calcined in a fan drying oven in a condition at 120° C. for 15 minutes to form a calcined silver film. The specific resistance value of the obtained calcined silver film was measured by a four-terminal method, but conductivity was not obtained.

[2] Further, separately, after being formed, the coating film was immediately calcined in a fan drying oven in a condition at 220° C. for 5 minutes to form a calcined silver film. The specific resistance value of the obtained calcined silver film was measured by a four-terminal method and found to be 32.0 μΩcm In each of the examples, 2-ethylhexylamine having a branched structure was used as an amine component. Therefore, it was possible to impart excellent conductivity to a calcined silver film even when calcined silver film having a thickness as large as 10 μm was formed by calcining at a low temperature.

On the other hand, in Comparative Example 2, n-octylamine having the same molecular weight as 2-ethylhexylamine was used instead of 2-ethylhexylamine in the same amount (weight, and moles) as 2-ethylhexylamine used in Example 4, but the calcined silver film formed in Comparative Example 2 was much inferior in conductivity to that formed in Example 4.

Further, in Comparative Example 1, n-hexylamine smaller in molecular weight than 2-ethylhexylamine was used instead of 2-ethyhexylamine in Example 1 in an equimolar amount (i.e., less weight) to 2-ethylhexylamine used in Example 1, but the calcined silver film formed in Comparative Example 1 was inferior in conductivity to that formed in Example 1.

The invention claimed is:

1. A method for producing silver nano-particles comprising:
   mixing a silver compound with an aliphatic amine component comprising at least a linear aliphatic hydrocarbon monoamine (A) comprising a linear aliphatic hydrocarbon group and one amino group, said aliphatic hydrocarbon group having 6 or more carbon atoms in total and a branched aliphatic hydrocarbon monoamine (D) comprising a branched aliphatic hydrocarbon group and one amino group, said branched aliphatic hydrocarbon group having 4 or more carbon atoms, to form a complex compound comprising the silver compound and the amines; and
   thermally decomposing the complex compound by heating to form silver nano-particles.

2. The method for producing silver nano-particles according to claim 1, wherein the silver compound is silver oxalate.

3. The method for producing silver nano-particles according to claim 1, wherein the branched aliphatic hydrocarbon group in the branched aliphatic hydrocarbon monoamine (D) has 4 to 16 carbon atoms.

4. The method for producing silver nano-particles according to claim 1, wherein the aliphatic amine further comprises at least one of:
   a linear aliphatic hydrocarbon monoamine (B) comprising a linear aliphatic hydrocarbon group and one amino group, said aliphatic hydrocarbon group having 5 or less carbon atoms in total; and
   an aliphatic hydrocarbon diamine (C) comprising an aliphatic hydrocarbon group and two amino groups, said aliphatic hydrocarbon group having 8 or less carbon atoms in total.

5. The method for producing silver nano-particles according to claim 4, wherein the aliphatic hydrocarbon monoamine (B) is an alkylmonoamine having 2 or more and 5 or less carbon atoms.

6. The method for producing silver nano-particles according to claim 4, wherein the aliphatic hydrocarbon monoamine (B) is a butylamine.

7. The method for producing silver nano-particles according to claim 1, wherein the aliphatic hydrocarbon monoamine (A) is an alkylmonoamine having 6 or more and 12 or less carbon atoms.

8. The method for producing silver nano-particles according to claim 1, wherein the branched aliphatic hydrocarbon monoamine (D) is contained in an amount of 10 mol % to 50 mol % of a total of the aliphatic amine.

9. The method for producing silver nano-particles according to claim 1, wherein the aliphatic amine is used in a total amount of 1 to 50 moles per 1 mole of silver atoms in the silver compound.

10. Silver nano-particles produced by the method according to claim 1.

11. A silver coating composition comprising silver nano-particles produced by the method according to claim 1, and an organic solvent.

12. A silver conductive material comprising:
   a substrate, and
   a silver conductive layer obtained by applying, onto the substrate, a silver coating composition comprising silver nano-particles produced by the method according to claim 1 and an organic solvent, and calcining the silver coating composition.

* * * * *